United States Patent
Pham

(10) Patent No.: US 7,051,249 B2
(45) Date of Patent: May 23, 2006

(54) ANALYZING A BIT ERROR RATE OF A COMMUNICATION LINK

(75) Inventor: Tiet Pham, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 321 days.

(21) Appl. No.: 10/307,144

(22) Filed: Nov. 27, 2002

(65) Prior Publication Data

US 2004/0103350 A1 May 27, 2004

(51) Int. Cl.
*G06F 11/00* (2006.01)

(52) U.S. Cl. ..................... 714/704
(58) Field of Classification Search ........... 714/704, 714/706, 708, 712
See application file for complete search history.

(56) References Cited

U.S. PATENT DOCUMENTS

| | | | |
|---|---|---|---|
| 5,606,563 A | 2/1997 | Dorbolo et al. | |
| 5,724,362 A | * 3/1998 | Lau | ............ 714/704 |
| 5,764,651 A | 6/1998 | Bullock et al. | |

* cited by examiner

*Primary Examiner*—Guy Lamarre
*Assistant Examiner*—James C. Kerveros
(74) *Attorney, Agent, or Firm*—Fogg and Associates, LLC; John M. Powers

(57) ABSTRACT

A bit error rate or other performance characteristic of a communication link is monitored using a state machine. The state machine includes at least three states — for example, a NO ALARM state, an ALARM DETECTION state, and an ALARM state. A sliding window is used to determine when to transition from the ALARM DETECTION state to the NO ALARM state or the ALARM state. A sliding window is also used to determine when to transition from an ALARM state to a NO ALARM state. A respective sum is calculated as a function of the sliding window for use in making such determinations.

50 Claims, 13 Drawing Sheets

ANALYZING A BIT ERROR RATE OF A COMMUNICATION LINK

TECHNICAL FIELD

The following description relates to telecommunications in general and to performance monitoring of a communication link in particular.

BACKGROUND

One way in which the performance of a communication link is monitored is by monitoring a bit error rate (BER) of the link. A BER is typically defined as the number of errors that occur during the transmission or reception of a given number of bits. The transmission or reception of a bit is referred to here as "processing" a bit. The errors include, for example, cyclic code redundancy (CRC) errors or other code violations.

In some applications, a threshold BER value is established so that when the BER exceeds the threshold BER, some action takes place. For example, an alarm can be raised, the rate at which data is processed can be altered, or alternate or additional communication media can be used. For example, in one embodiment of a high-speed digital subscriber line 4 (HDSL4) system, an HDSL4 BER (HBER) threshold for an HDSL4 communication link used in such a system is defined as 1 error in one million bits (expressed as "1E-6"). Therefore, if data is transmitted at the rate of 1.544 million bits per second (that is, at T1 speed), the HBER threshold corresponds to an HBER of 1.544 million bits per second times 1 error per million bits times 60 seconds, or 92.64 errors in each 60-second period. An HBER threshold of 1E-6 corresponds, therefore, to an HBER of approximately 93 errors in a 60-second period.

One way in which a BER reading is obtained is by counting, for a given period of time, the number of errors that occur. Then, the BER for that period is calculated by dividing the number of errors counted by the number of bits processed in a given period. The number of bits processed in a given period can be obtained by counting each processed bit or by calculating the number of processed bits based on the line speed. It is common to average several such BER readings in an attempt to improve the accuracy of the calculated BER. The average is then, for example, compared to a BER threshold.

In some communication systems, BER readings tend to vary widely. For example, BER readings in some devices include erroneous values that are very large relative to other, accurate readings. This variation can result from the equipment used to make the BER reading and/or from the environment in which the equipment is used. As a result, when several BER readings are averaged, one large, erroneous reading can cause the resulting average to be greater than a specified BER threshold regardless of what the other measurements are. In some situations, this can increase the number of false BER alarms that are generated.

SUMMARY

In general, in one aspect, a method of analyzing an attribute of a communication link includes obtaining error count data. The error count data includes a plurality of error counts and the plurality of error counts includes a current error count. The method also includes, in a first state, entering a second state when the current error count is greater than a first threshold value but less than a second threshold value. The method also includes, in the first state, entering a third state when the current error count is greater than the second threshold value. The method further includes, in the second state, for each error count obtained while in the second state, calculating a first sum. The first sum is a sum of up to a first number of error counts associated with the second state. The method also includes, in the second state, entering the third state when the first sum is greater than the second threshold value. The method further includes, in the second state, entering the first state when the first sum is less than the first threshold value and the first sum is the sum of the first number of error counts associated with the second state. Moreover, the method further includes, in the third state, for each error count obtained while in the third state, calculating a second sum. The second sum is the sum of up to a second number of error counts associated with the third state. The method further includes, in the third state, entering the first state when the second sum is less than the second threshold value and the second sum is the sum of the second number of error counts associated with the third state.

In general, in another aspect, a telecommunication device includes an interface adapted to couple the telecommunication device to a communication link. The telecommunication device is adapted to obtain error count data. The error count data includes a plurality of error counts and the plurality of error counts includes a current error count. The telecommunication device is also adapted to, in a first state, enter a second state when the current error count is greater than a first threshold value but less than a second threshold value, and enter a third state when the current error count is greater than the second threshold value. The telecommunication device is also adapted to, in the second state, for each error count obtained while in the second state, calculate a first sum. The first sum is a sum of up to N error counts associated with the second state. The telecommunication device is also adapted to, in the second state, enter the third state when the first sum is greater than the second threshold value, and enter the first state when the first sum is less than the first threshold value and the first sum is the sum of N error counts associated with the second state. The telecommunication device is also adapted to, in the third state, for each error count obtained while in the third state, calculate a second sum. The second sum is the sum of up to N error counts associated with the third state. The telecommunication device is further adapted to, in the third state, enter the first state when the second sum is less than the second threshold value and the second sum is the sum of N error counts associated with the third state.

In general, in another aspect, a line interface unit includes an upstream interface adapted to couple the line interface unit to an upstream communication link and a downstream interface, coupled to the upstream interface, adapted to couple the line interface unit to a downstream communication link. The line interface unit also includes a controller, coupled to upstream interface and downstream interface. The controller is adapted to obtain error count data. The error count data includes a plurality of error counts and the plurality of error counts includes a current error count. The controller is further adapted to, in a first state, enter a second state when the current error count is greater than a first threshold value but less than a second threshold value, and enter a third state when the current error count is greater than the second threshold value. The controller is further adapted to, in the second state, for each error count obtained while in the second state, calculate a first sum. The first sum is a sum of up to N error counts associated with the second state.

The controller is further adapted to enter the third state when the first sum is greater than the second threshold value, and enter the first state when the first sum is less than the first threshold value and the first sum is the sum of N error counts associated with the second state. The controller is further adapted to, in the third state, for each error count obtained while in the third state, calculate a second sum. The second sum is the sum of up to N error counts associated with the third state. The controller is further adapted to enter the first state when the second sum is less than the second threshold value and the second sum is the sum of N error counts associated with the third state.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
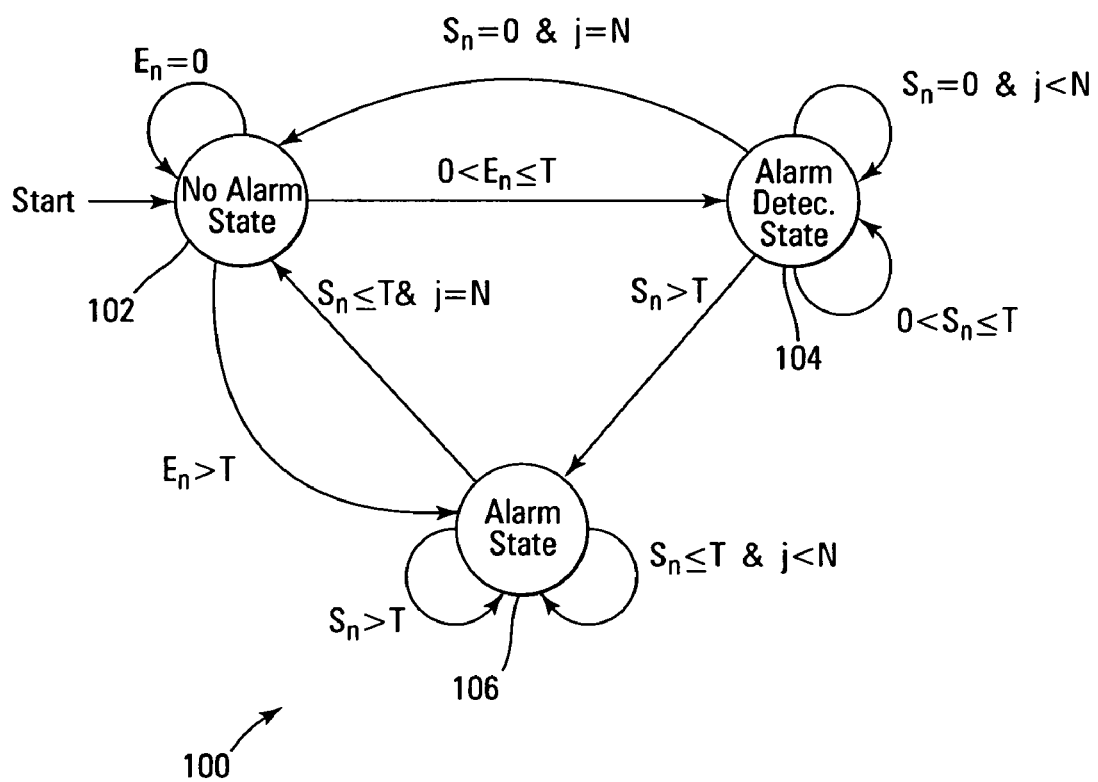
FIG. 1 is a diagram of one embodiment of a state machine that monitors a bit error rate of a communication link.

FIG. 1 is a diagram of one embodiment of a state machine 100 that monitors a bit error rate of a communication link. Although the embodiment shown in FIG. 1 monitors a bit error rate, it is to be understood that in other embodiments other data related to a communication link is monitored. An error count $E_i$ is read for each sample period i, where $E_i$ is the error count read at the ith sample period. The most recent sample period is i=n and the most recent error count (also referred to here as the "current" error count) is represented here as $E_n$.

In one embodiment, a counter (implemented, for example, in hardware and/or software) counts each error (for example, a CRC or code violation error) occurring during the sample period. The error count $E_n$ is read, in such an embodiment, by retrieving the error count from the counter. In one implementation of such an embodiment, the counter is reset each time the counter is read. In another implementation, the counter is not reset each time the counter is read and, instead, the most recent previous counter reading is subtracted from the current counter reading in order to get the current error count for the particular sample period. In the embodiment shown in FIG. 1, an error count $E_n$ is read every second.

When the state machine 100 is started, the state machine 100 enters a first state 102. The first state 102, in the embodiment shown in FIG. 1, is a "NO ALARM STATE" in which no alarm is raised. While the state machine 100 is in the first state 102, when an error count $E_n$ is greater than a first threshold value but less than or equal to a second threshold value, the state machine 100 enters a second state 104. In the embodiment shown in FIG. 1, the second state is an "ALARM DETECTION STATE." The ALARM DETECTION STATE is an intermediary state in which no alarm is raised. In that embodiment, the first threshold value is zero (0) and the second threshold value is a BER threshold T. The BER threshold T is a BER threshold specifying a number of errors occurring in N sample periods. In the embodiment shown in FIG. 1, N is equal to 60. In other embodiments, however, other values for the first threshold value and second threshold value are used.

While the state machine 100 is in the first state 102, when the current error count $E_n$ is greater than the second threshold value, the state machine 100 enters a third state 106. In the embodiment shown in FIG. 1, the third state 106 is an "ALARM STATE" in which an alarm indicating that the BER threshold has been exceeded is raised. While the state machine 100 is in the first state 102, when the current error count $E_n$ is less than or equal to the first threshold value, the state machine 100 remains in the first state 102. In the embodiment shown in FIG. 1, if the error count $E_n$ is equal to zero, the state machine 100 remains in the NO ALARM STATE 102.

While the state machine 100 is in the second state 104, a window W is defined. The window W includes up to the last N, most-recent error counts read while the state machine 100 remains in the second state 104. The current number of error counts in the window W is represented here by j. The number j of error counts in the window W is less than or equal to N ($j \leq N$). In one embodiment, the first error count (referred to here as error count $E_W$) included in the window W is the last error count read while the state machine 100 was in the prior state from which the state machine 100 transitioned to the second state 104. In another embodiment, the window W does not include this last error count and the first error count $E_W$ included in the window W is the first error count read while the state machine 100 is in the second state 104.

After the window W contains N error counts (j=N), while the state machine 100 remains in the second state 104, the window W is "slid" forward by one error count after each current error count $E_n$ is read so that the window W contains the N most-recent error counts (that is $E_n$, $E_{n-1}$, ... $E_{W=n-N+1}$). In other words, the window W is a sliding window.

A sum $S_i$ is calculated for each sample period i while the state machine 100 is in the second state 104. The sum $S_i$ is the sum of all the error counts in the window W at sample period i. In other words, the current sum $S_n$ (i=n) can be defined as follows:

$$S_n = \sum_{i=w}^{j} E_i$$

where w is the first sample period of the window W and n is the current sample period.

Although window W is described as "containing" or "including" certain error counts, it is understood that, in some embodiments (for example, the embodiment shown in FIG. 1), the window W is a logical window. That is, in such embodiments, there is no actual memory, buffer, or data structure in which the error counts included in the window W are stored. In one such embodiment, for example, the sum $S_n$ is calculated by adding the current error count $E_n$ to the previous value of the sum $S_{n-1}$. A counter is used to keep track of the number of error counts used to calculate the sum $S_n$; this number is also the number of error counts "included" in the window W. In other embodiments, a memory, buffer, or data structure is used to store each error count included in the window W. In such other embodiments, the sum $S_n$ is calculated by summing all the error counts stored in such memory, buffer, or data structure.

While in the second state 104, when the current sum $S_n$ is greater than the first threshold value and less than or equal to the second threshold value, state machine 100 remains in the second state 104. For example, in the embodiment shown in FIG. 1, when the current sum $S_n$ is greater than 0 and less than or equal to the BER threshold T, the state machine 100 remains in the ALARM DETECTION STATE. As noted above, after the window W contains N error counts (j=N), while the state machine 100 remains in the second state 104, the window W is slid forward by one error count after each current error count $E_n$ is read so that the window W contains the N most-recent error counts (that is $E_n$, $E_{n-1}$, ... $E_{W=n-N+1}$) and the current sum $S_n$ is the sum of the error counts included in the window W.

While in the second state 104, when the current sum $S_n$ is greater than the second threshold value, the state machine 100 enters the third state 106. For example, in the embodiment shown in FIG. 1, when the sum $S_n$ is greater than the BER threshold T, the state machine 100 enters the ALARM STATE.

While in the second state 104, when the window W contains N error counts (j=N) and the current sum $S_n$ is less than or equal to the first threshold value, the state machine 100 enters the first state 102. For example, in the embodiment shown in FIG. 1, when the window W contains N error counts (j=N) and the current sum $S_n$ is less than or equal to zero (0), the state machine 100 enters the NO ALARM STATE. When the window W contains N error counts, the $S_n$ is the sum of the N most-recent error count readings (En, En-1, ..., $E_{W=n-N+1}$).

While the state machine 100 is in the third state 106, a window W is also defined. In the embodiment, shown in FIG. 1, the window used in the third state 106 has the same attributes as the window used in the second state 104 and is also referred to here as the window W. In other embodiments, however, the window used in the third state 106 has different attributes. The window W includes up to the last N, most-recent error counts $E_n$ read while the state machine 100 remains in the third state 106. As with the second state 104, the number of error count readings in the window W while the state machine 100 is in the third state 106 is represented here by j. The number or error count readings j in the window W is less than or equal to N (j≤N). In one embodiment, the first error count (referred to here as error count $E_W$) included in the window W is the last error count read while the state machine 100 was in the prior state from which the state machine 100 transitioned to the third state 106. In another embodiment, the window W does not include this last error count and the first error count $E_W$ included in the window W is the first error count read while the state machine 100 is in the third state 106.

As with the second state 104, after the window W contains N error counts, while the state machine 100 remains in the third state 106, the window W is "slid" forward by one error count after each current error count $E_n$ is read so that the window W contains the N most-recent error counts ($E_n$, $E_{n-1}$, ... $E_{W=n-N+1}$).

As with the second state 104, a sum $S_i$ is calculated for each sample period i while the state machine 100 is in the third state 106. The sum $S_j$ is the sum of all the error counts in the window used while the state machine 100 is in the third state 106. In the embodiment shown in FIG. 1, as noted above, the window used in the third state 106 has the same attributes as the window W used in the second state 104. Thus, the sum $S_i$ is calculated the same way the sum used in the second state 104 is.

While in the third state 106, if the current sum $S_n$ (i=n) is greater than the second threshold value, the state machine 100 remains in the third state 106. For example, in the embodiment shown in FIG. 1, while in the ALARM STATE, if the current sum $S_n$ is greater than the BER threshold T, the state machine 100 remains in the ALARM STATE.

Also, while in the third state 106, if the current sum $S_n$ is less than or equal to the second threshold value and the window W contains less than N error count readings (j≤N), the state machine 100 remains in the third state 106. For example, in the embodiment shown in FIG. 1, while in the ALARM STATE, if the current sum $S_n$ is less than or equal to the BER threshold greater T and the window W contains less than N error count readings (j≤N), the state machine 100 remains in the ALARM STATE.

While in the third state 106, when the current sum $S_n$ is less than or equal to the second threshold value and the window W contains N error count readings (j=N), then the state machine 100 enters the first state 102. For example, in the embodiment shown in FIG. 1, while in the ALARM STATE, if the current sum $S_n$ is less than or equal to the BER threshold T and the window W contains N error count readings (j=N), the state machine 100 enters in the NO ALARM STATE. When the window W contains N error count readings (j=N), the current sum $S_n$ is equal to the N most-recent error count readings ($E_n$, $E_{n-1}$, ... $E_{W=n-N+1}$).

Figure 2A:
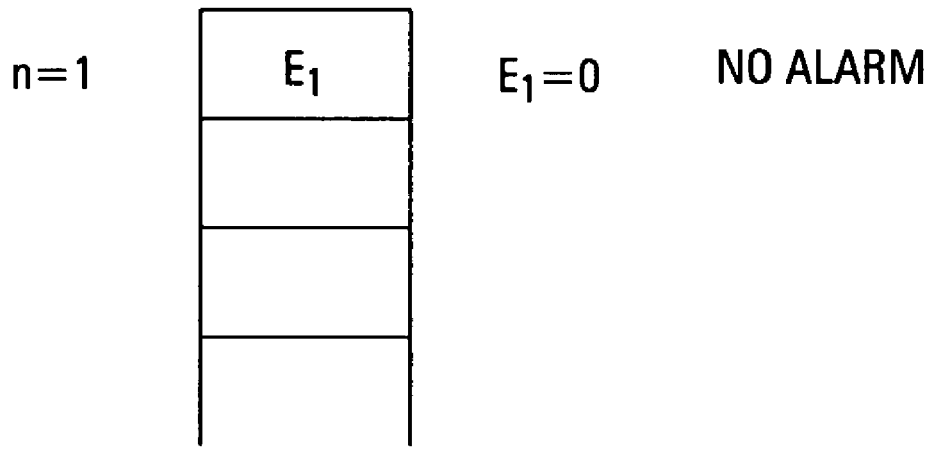
FIGS. 2A–2K are schematic diagrams illustrating one example of the operation of the embodiment of the state machine shown in FIG. 1.
Figure 2B:
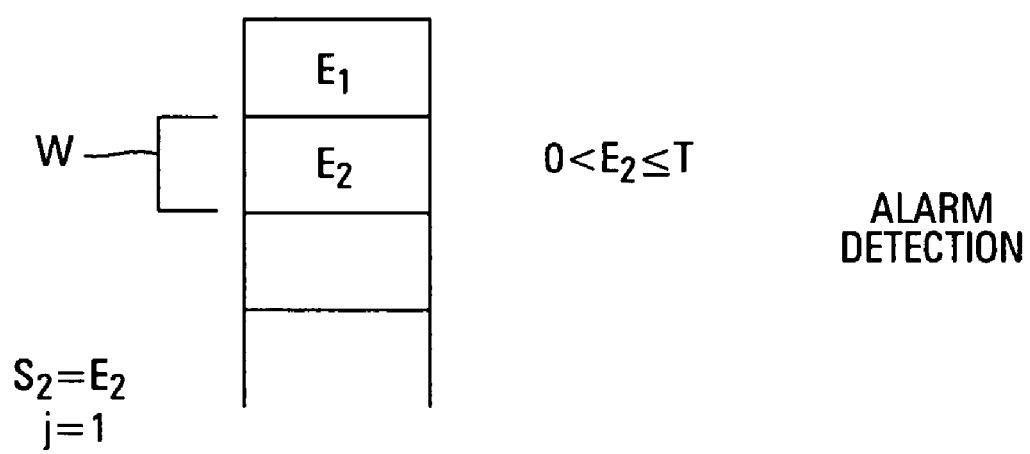

FIGS. 2A–2K are schematic diagrams illustrating one example of the operation of the embodiment of the state machine 100 shown in FIG. 1. As noted above, during operation of that embodiment, an error count $E_n$ is read at each second. That is, in the embodiment shown in FIG. 1 the sample period is one second. As shown in FIG. 2A, the state machine 100 is initially in the NO ALARM STATE. The first error count reading ($E_1$, n=1) is equal to 0. Then, as shown in FIG. 2B, the second error count reading ($E_2$, n=2) is greater than zero (the first threshold value) and is less than or equal to the BER threshold T (the second threshold value). As a result, the state machine 100 enters the ALARM DETECTION STATE.

As shown in FIG. 2B, when the state machine 100 enters the ALARM DETECTION STATE, the window W is defined. As noted above the window W includes up to the N most-recent error count readings since the state machine 100 transitioned to the ALARM STATE. In the example shown in FIGS. 2A–2K, N equals 60 error count readings, which corresponds to a 60-second window. At the point shown in FIG. 2B (n=2), the window W includes one error count, $E_2$. The current sum $S_2$ (n=2) is calculated and equals, at this point, $E_2$. In the embodiment shown in this example, the last error count read while the state machine was in the NO ALARM STATE, $E_2$, is the first error count in the window W ($E_W=E_2$).

Figure 2C:
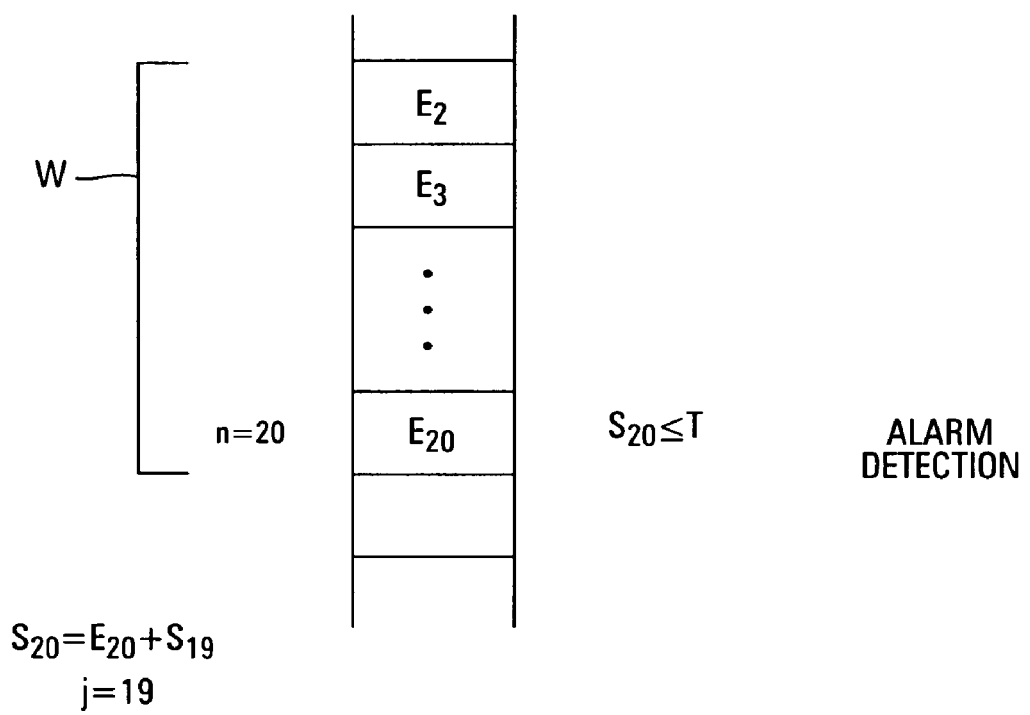

At the twentieth sample period (n=20), shown in FIG. 2C, the window W includes 19 error count readings, $E_2$ through $E_{20}$. After each of the error count readings $E_3$ (n=3) through $E_{20}$ (n=20), the sum $S_n$ is calculated by adding the current error count $E_n$ to the value of the sum for the previous sample period $S_{n-1}$. After each of the error counts $E_3$ through $E_{20}$, the current value of the sum $S_n$ is less than the BER threshold T (the second threshold value). As a result, the state machine 100 remains in the ALARM DETECTION STATE for the third through the twentieth sample periods (for n=3 through n=20). If, contrary to what is shown in the example of FIGS. 2A–2K, the result of any of the sum $S_n$ calculations for the third through the twentieth sample periods were greater than the BER threshold T, then the state machine 100 would enter the ALARM STATE.

Figure 2D:
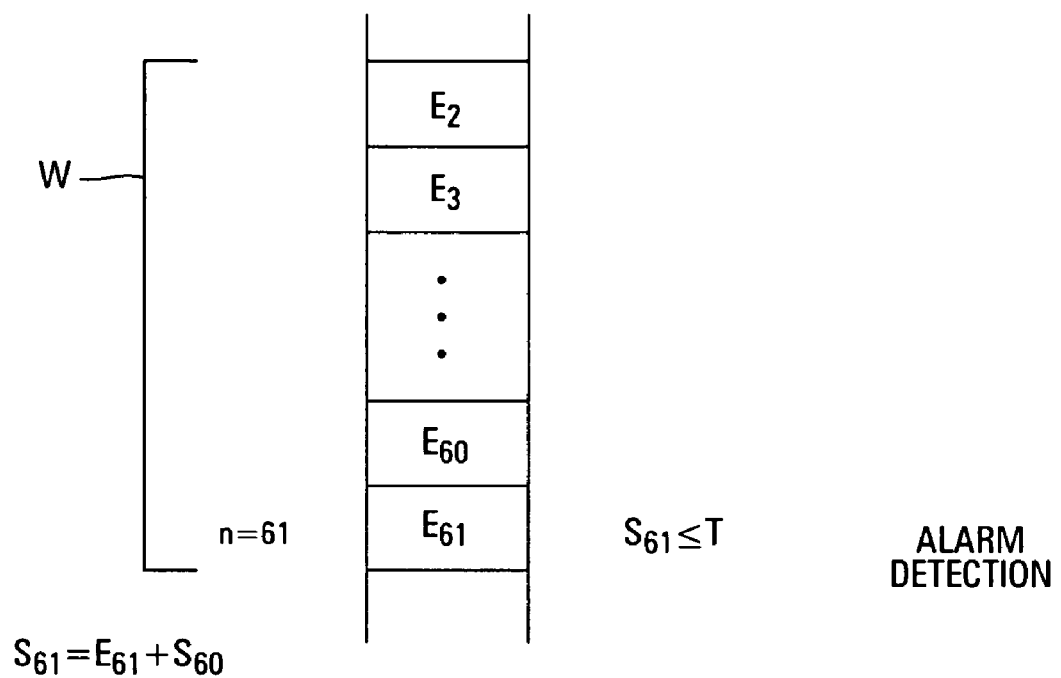

FIG. 2D shows state machine 100 at the sixty-first sample period (n=61). The state machine 100 has remained in the ALARM DETECTION STATE for the twenty-first sample period through the sixty-first sample period (for n=21 through n=61). The sixty-first error count $E_{61}$ is read and the window W now includes 60 error count readings ($E_2$ though $E_{61}$). The sum $S_{61}$ is calculated by adding the current error count E61 to the value of the sum for the previous sample period $S_{60}$. The sum $S_{61}$ at the sixty-first sample period (n=61) is less than or equal to the BER threshold T and, as a result, the state machine 100 remains in the ALARM DETECTION STATE.

Figure 2E:
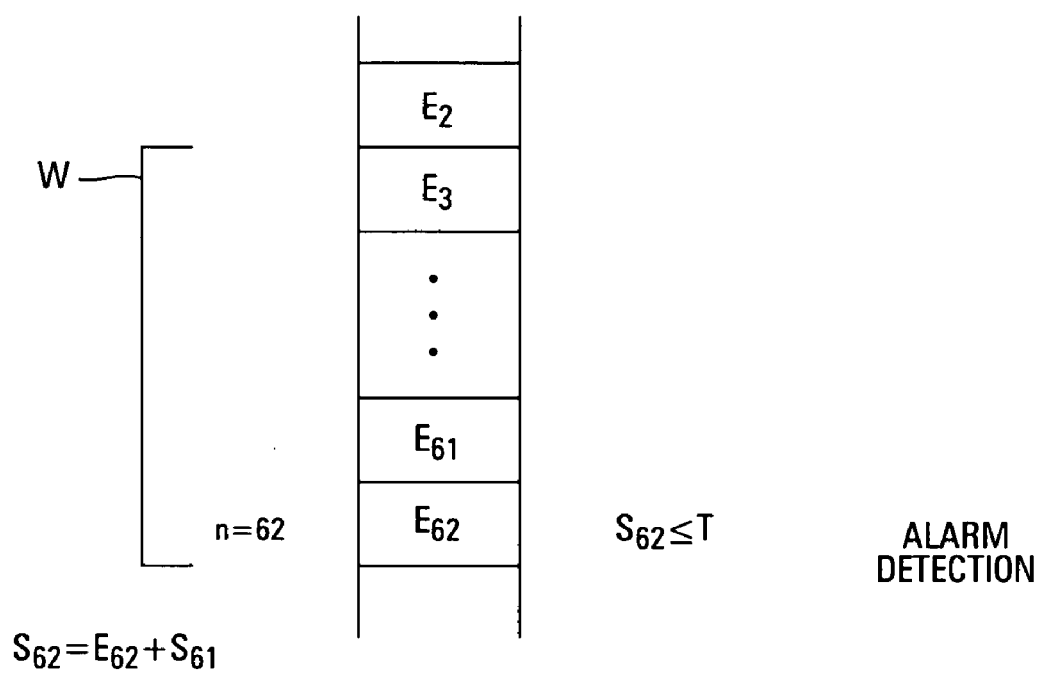

FIG. 2E shows state machine 100 at the sixty-second sample period (n=62). The sixty-second error count $E_{62}$ is read and the window W is slid forward one sample period and includes the 60 most-recent error count readings $E_3$ through $E_{62}$. The sum $S_{62}$ is calculated by adding the current error count $E_{62}$ to the value of the sum from the previous sample period ($S_{61}$). The sum $S_{62}$ at the sixty-second sample period is less than or equal to the BER threshold T and, as a result, the state machine 100 remains in the ALARM DETECTION STATE.

Figure 2F:
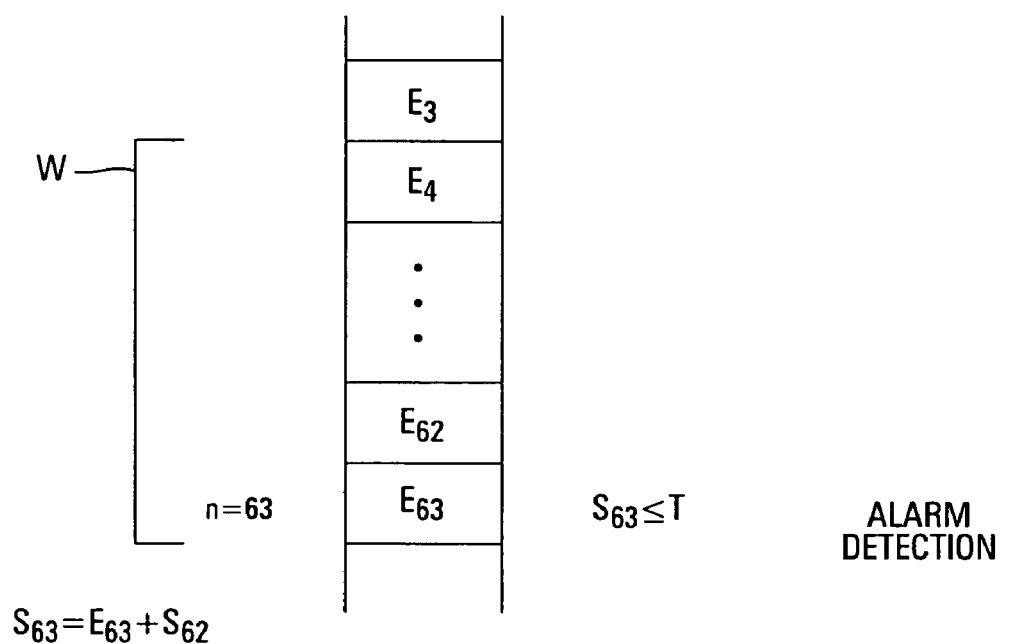

FIG. 2F shows state machine 100 at the sixty-third sample period (n=63). The sixty-third error count $E_{63}$ is read and the window W is slid forward one sample period and includes the 60 most-recent error count readings $E_4$ through $E_{63}$. The sum $S_{63}$ is calculated by adding the current error count $E_{63}$ to the value of the sum from the previous sample period $S_{62}$. The sum $S_{63}$ at the sixty-third sample period is less than or equal to the BER threshold T and, as a result, the state machine 100 remains in the ALARM DETECTION STATE.

Figure 2G:
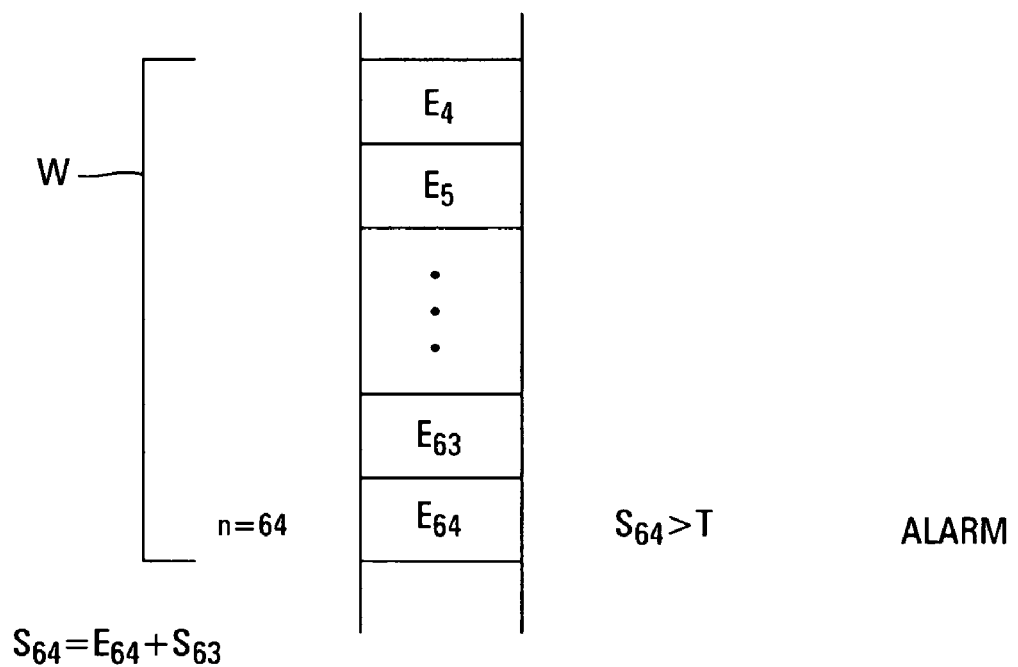

FIG. 2G shows state machine 100 at the sixty-fourth sample period (n=64). The sixty-fourth error count $E_{64}$ is read and the window W is slid forward one sample period and includes the 60 most-recent error count readings $E_5$ through $E_{64}$. The sum $S_{64}$ is calculated by adding the current error count $E_{64}$ to the value of the sum for the previous sample period $S_{63}$. The sum $S_{64}$ at the sixty-fourth sample period is greater than the BER threshold T and, as a result, the state machine 100 enters the ALARM STATE.

When the state machine 100 enters the ALARM STATE, the window W used by the ALARM STATE (the third state 104) is defined. As noted above, the window W used by the ALARM STATE has the same attributes as the window used by the ALARM DETECTION STATE (the second state 104) and includes up to the N most-recent error count readings since the state machine 100 transitioned to the ALARM STATE. In the embodiment shown in this example, the last error count read while the state machine was in the ALARM DETECTION STATE, $E_{64}$, is the first error count in the window W. At the point shown in FIG. 2G (n=64), the window W includes one error count, $E_{64}$. The current sum $S_{64}$ (n=64) is calculated and equals, at this point, $E_{64}$ ($S_{64}=E_{64}$).

Generally, once the state machine 100 enters the ALARM STATE, the state machine 100 will remain in the ALARM STATE for a minimum of N sample periods, unless the state machine 100 is otherwise reset. For every sample period that the state machine 100 is in the ALARM STATE, the current error count $E_n$ is read and the current sum $S_n$ is calculated by adding the current error count $E_n$ to the value of the sum $S_{n-1}$ for the previous sample period. If there are less than N error counts in the window W, (j≦N)), the sum $S_n$ is computed and the state machine 100 remains in the ALARM STATE regardless of what the current value of the sum $S_n$ is. In other embodiments, the sum $S_n$ is not computed when there are less than N error counts in the window W; instead, when there are N error counts in the window W (j=N) and the state machine 100 remains in the ALARM STATE, the sum $S_n$ is calculated by summing all the error counts in the window W. In such an embodiment, the error counts in the window W are stored in a memory, buffer, or other data structure.

Figure 2H:
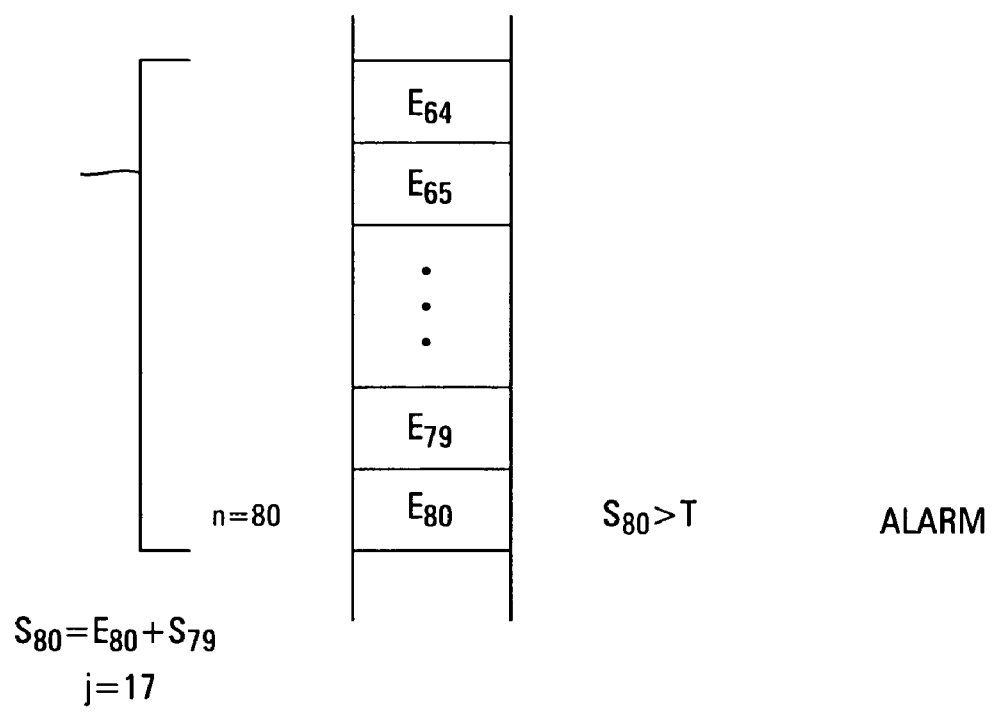

For example, at the eightieth sample period (n=80), shown in FIG. 2H, the window W includes 17 error count readings, $E_{64}$ through $E_{80}$, which is less than 60 (j=17≦N). After each of the error count readings $E_{64}$ (n=64) through $E_{80}$ (n=80), the sum $S_n$ associated with that sample period is calculated by adding the current error count reading $E_n$ to the value of the sum $S_{n-1}$ for the previous sample period and the state machine 100 remains in the ALARM STATE.

Figure 2I:
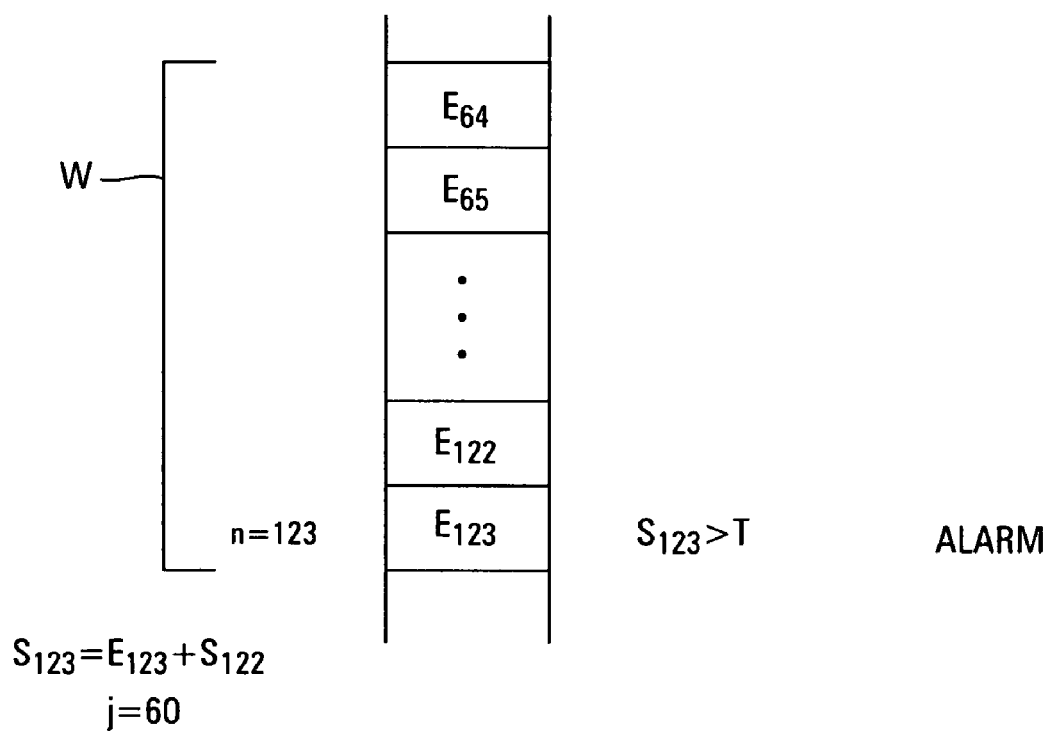

FIG. 2I shows state machine 100 at the one hundred twenty-third sample period (n=123). The one hundred twenty-third error count $E_{123}$ is read and the window W includes 60 error count readings ($E_{64}$ through $E_{123}$). The sum $S_{123}$ is calculated by adding the error count $E_{123}$ to the value of the sum $S_{122}$ for the previous sample period. The sum $S_{123}$ at the one hundred twenty-third sample period is greater than the BER threshold T and, as a result, the state machine 100 remains in the ALARM STATE.

Figure 2J:
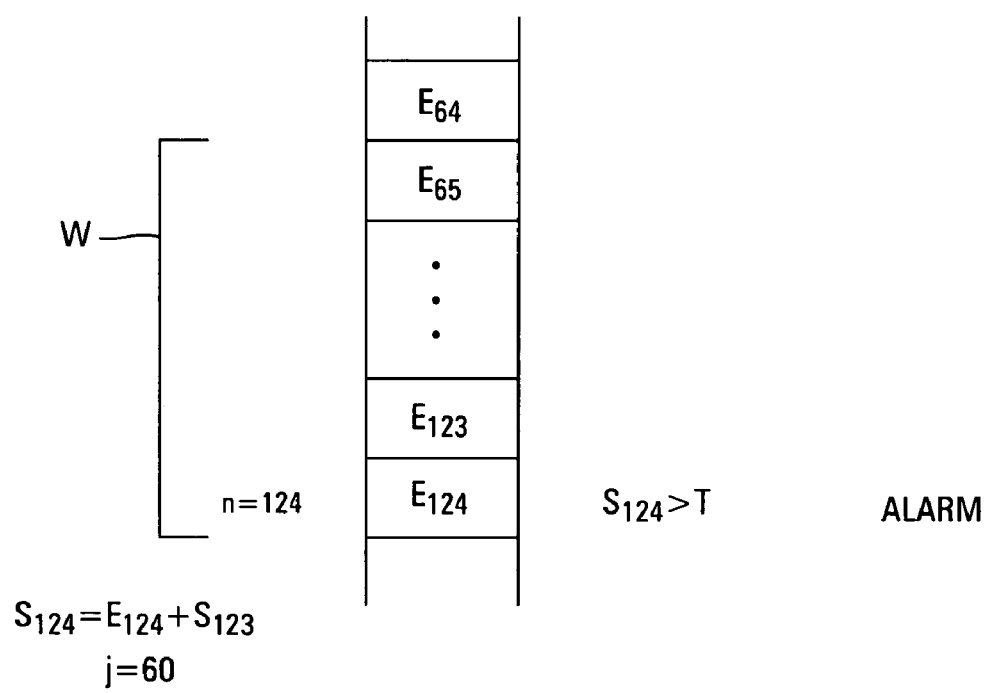

FIG. 2J shows state machine 100 at the one hundred twenty-fourth sample period (n=124). The one hundred twenty-fourth error count $E_{124}$ is read and the W is slid forward one sample period and includes the 60 most-recent error count readings $E_{65}$ through $E_{124}$. The sum $S_{124}$ is calculated by adding the error count $E_{124}$ to the value of the sum $S_{123}$ for the previous sample period. The sum $S_{164}$ at the one hundred twenty-fourth sample period is greater than to the BER threshold T and, as a result, the state machine 100 remains in the ALARM STATE.

Figure 2K:
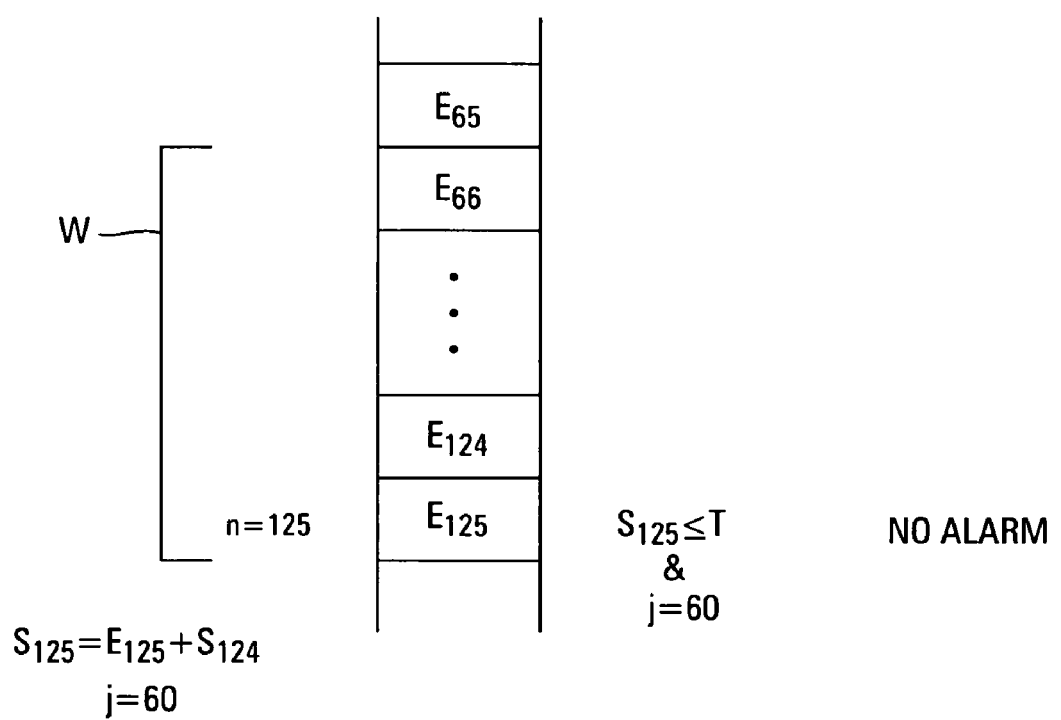

FIG. 2K shows state machine 100 at the one hundred twenty-fifth sample period (n=125). The one hundred twenty-fifth error count $E_{125}$ is read and the window W is slid forward one sample period and includes the 60 most-recent error count readings $E_{66}$ through $E_{125}$. The sum $S_{125}$ is calculated by adding the current error count $E_{125}$ to the value of the sum $S_{124}$ for the previous sample period. The sum $S_{125}$ at the one hundred twenty-fifth sample period is less than or equal to the BER threshold T and, as a result, the state machine 100 enters the NO ALARM STATE.

Embodiments of the state machine 100 provide a mechanism by which a performance characteristic of a communication link, for example, a bit error rate associated with an HDSL4 communication link, can be monitored. This mechanism is especially well suited for use with devices that tend to produce performance readings (for example, error count readings) that vary widely and typically include erroneous readings that are large relative to other, correct performance readings. Embodiments of state machine 100 can reduce inaccuracies resulting from such erroneous readings as compared to taking the average of multiple readings.

FIGS. 1 and 2A–2K depict a particular embodiment of the state machine 100. It is to be understood that there are other embodiments of the state machine 100. For example, in the embodiment shown in FIGS. 1 and 2A–2K, the size of the window W used in the second state 104 and the size of the window used in the third state 106 are the same. In other embodiments, the size of the window used by the second state 104 differs from the size of the window used by the third state 106. Moreover, in other embodiments, the size of the window used in the second state and the size of the window use in the third state are the same, but a window size other than 60 one-second sample periods is used.

Also, in the embodiment shown in FIGS. 1 and 2A–2K, the first error count $E_W$ included in the window W used by the second state and the third state is, in both cases, the last error count read while the state machine 100 was in the prior state from which the state machine 100 transitioned to the second state 104 or the third state 106, respectively. In other embodiments, the window W used by the second state 104 and/or the window used by the third state 106 does not include this error count; in such an embodiment, the first error count $E_W$ included in the window is the first error count read while the state machine 100 is in the second state 104 or the third state 106, respectively.

Moreover, the embodiment shown in FIGS. 1 and 2A–2K uses particular conditions to identify when the state machine 100 should enter a new state. It is to be understood, however, that in other embodiments, other conditions are used. For example, the embodiment of the state machine 100 shown in FIGS. 1 and 2A–2K transitions from the first state 102 to the second state 104 if the current error count $E_n$ is greater than the first threshold value and less than or equal to the second threshold value. Another embodiment of the state machine 100 transitions from the first state 102 to the second state 104 if the current error count $E_n$ is greater than or equal to the first threshold value and less than or equal to the second threshold value, while another embodiment of the state machine 100 transitions from the first state 102 to the second state 104 if the current error count $E_n$ is greater than the first threshold value and less than the second threshold value.

Also, in the embodiments shown in FIGS. 1 and 2A through 2K, the current sum $S_n$ is calculated while in the second state 104 and the third state 106 by adding the current error count $E_n$ to the value of the sum $S_{n-1}$ for the sample period prior to the current sample period. In other embodiments, the sum used by the second state 104, the third state 106, or both are calculated by summing each error count included in the window W. In such an embodiment, the value of each error count included in the window W is stored, for example, in a memory, buffer, or data structure.

Embodiments of the state machine 100 are implemented in hardware, software, and combinations of hardware and software. For example, embodiments of state machine 100 are implemented using appropriate logic gates, memory (such as one or more flip-flops, and first-in-first-out (FIFO) buffers) and counters. In another embodiment, the state machine 100 is implemented using an application specific integrated circuit (ASIC). In other embodiments, a programmable processor is programmed to implement at least a portion of state machine 100. For example, in one such embodiment, state machine 100 is implemented as a program that includes, for example, data structures for storing the current state, the current sum, the current error count, and the number of error counts included in a window. Such a program also includes program instructions operable to transition from one state to the next state, retrieve the current error count, update the number of error counts included in a window, and calculate the sum. In one such embodiment, the data structures and program instructions are included in a larger program. In another such embodiment, the data structures and program instructions are a part of a stand alone program. In another embodiment, the data structure and program instructions implement a finite state machine.

Figure 3:
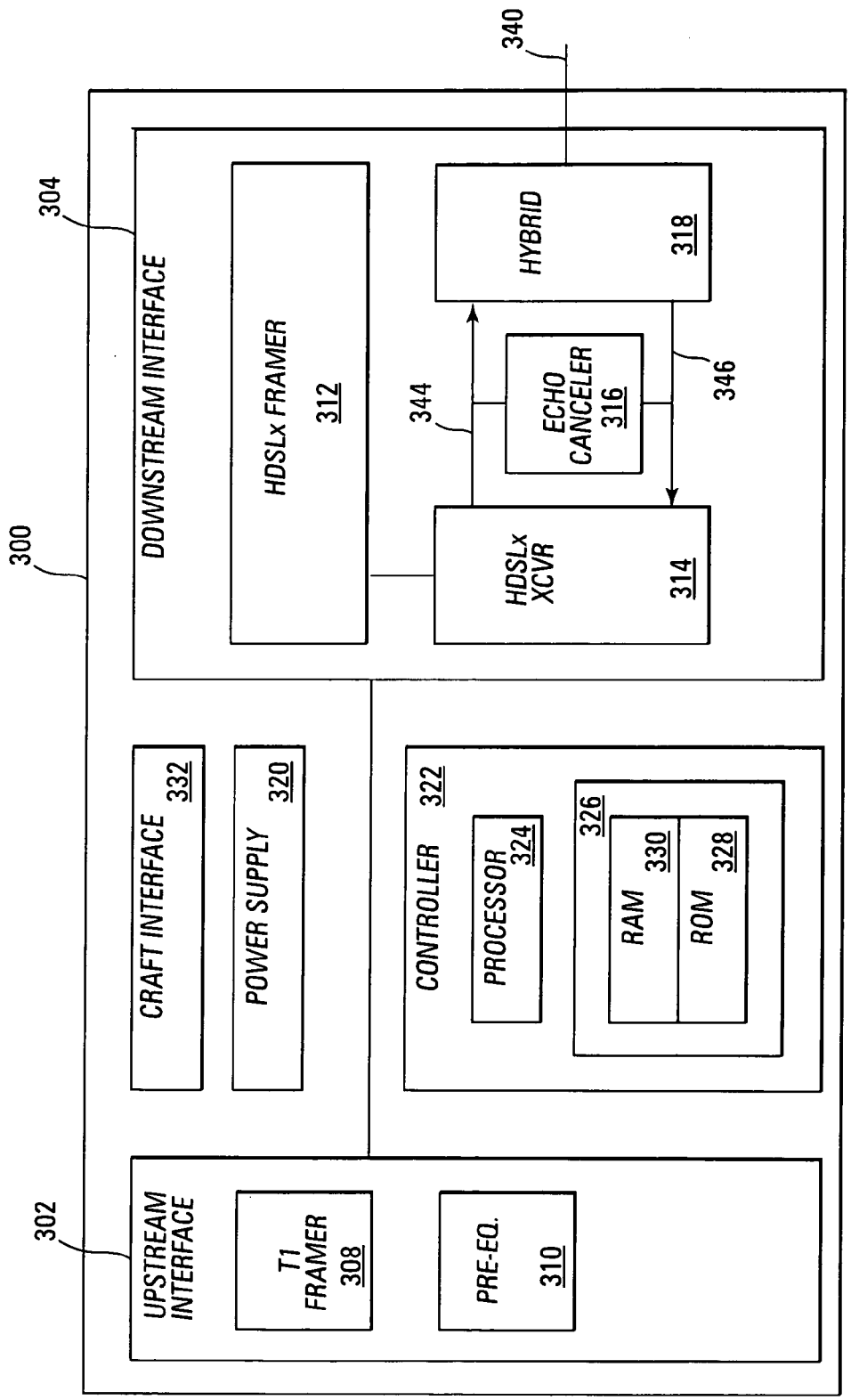
FIG. 3 is a block diagram of one embodiment of an HDSL4 line interface unit.

One embodiment of state machine 100 is implemented on an HDSL4 line interface card. FIG. 3 is a block diagram of one embodiment of an HDSL4 line interface unit 300 (also referred to here as a "line card" 300) suitable for use with such an embodiment. Line card 300 is used to send and receive DS1 traffic over an HDSL4 communication link using two twisted-pair telephone lines 340 (also referred to here as "local loops" or "loops"). The line card 300 includes an upstream interface 302 and a downstream interface 304. Upstream interface 302 and downstream interface 304 couple the line card 300 to an upstream link and a downstream link, respectively. In the embodiment shown in FIG. 3, the upstream link is a DSX-1 link that is cross-connected to a time division-multiplexing network. The upstream interface 302 couples the line card 300 to the DSX-1 link and includes, for example, a T1 framer 308 and a DSX-1 pre-equalizer 310. In the embodiment shown in FIG. 3, the downstream link is an HDSL4 link. The downstream interface 304 couples the line card 300 to the HDSL4 link. The HDSL4 link is implemented using the pair of twisted-pair telephone lines 340. The downstream interface 304 includes an HDSL4 chipset 305 that includes, for example, an HDSL2 framer 312, an HDSL2 transceiver 314. The downstream interface 304 also includes, for example, an echo canceller 316, and a hybrid circuit 318.

The line card 300 includes a power supply 320 for providing power to the various components of the line card 300. The line card 300 also includes control logic 322. For example, in the embodiment shown in FIG. 3, the control logic 322 includes a programmable processor 324 (such as a microprocessor) and a memory 326. Memory 326 includes both read-only memory ("ROM") 328 and random access memory ("RAM") 330. Although memory 326 is shown in FIG. 3 as having a separate ROM 328 and RAM 330, other memory configurations can be used, for example, using scratchpad memory included in the programmable processor 324.

Line card 300 also includes a craft interface 332. Craft interface 332 includes, for example, a universal asynchronous receiver-transmitter ("UART") 334 that couples an RS-232 serial port 336 to the processor 324. A user can connect a portable computer or other data terminal to the serial port 336 and communicate with an embedded control program executing on the programmable processor 324. Alternatively, the user can communicate with the embedded control program over an embedded operations channel carried among the DS1 traffic handled by the line card 300. Although FIG. 3 depicts an HDSL4 line interface unit, other telecommunications devices can be used to implement the techniques described here. For example, G.SHDSL, HDSL, HDSL2, asynchronous digital subscriber line (ADSL) devices can be used.

In operation, the line card 300 receives DS1 traffic from the downstream link on the downstream interface 304. The incoming DS1 traffic is formatted as HDSL frames. The downstream interface 304 processes the incoming frames and communicates the DS1 traffic to the upstream interface 302. The upstream interface 302 formats the DS1 traffic into T1 frames and transmits the frames out on the upstream link. A similar process occurs in reverse for DS1 traffic received on the upstream interface 302 from the upstream link. The incoming DS1 traffic is formatted as T1 frames. The upstream interface 302 processes the incoming frames and communicates the DS1 traffic to the downstream interface 304. The downstream interface 304 formats the DS1 traffic into HDSL frames and transmits the frames out on the downstream link.

In one embodiment, state machine 100 is implemented using an HDSL4 line card that includes the MtS180 chipset, which is commercially available from MetaLink. The state machine 100 is implemented by programming the programmable processor 324 so as to implement the state machine 100. Program instructions operable to implement the state machine 100 (for example, program instructions operable to cause the programmable processor to read the current error count, transition from one state to another state, track the number of error counts in the window, and calculate the sum) and associated data structures (for example, data structures containing the current state, the current error count, the number of error counts in a window, and the sum) are stored in memory 326. In one implementation, the program instructions are stored in ROM 328 and the data structures are stored in RAM 330. In such an embodiment, the programmable processor 324 retrieves the current error count from the HDSL4 chipset. In other embodiments, the programmable processor 324 is programmed so as to provide a software counter that calculates the current error count by counting the number of errors in a given sample period. In other embodiments, the state machine 100 is implemented on a device other than the line card 300 such as a computer programmed to operate as an element management system. In such an embodiment, the element management system retrieves the current error count from the line card 300 (for example, via the embedded operations channel).

The methods and techniques described here may be implemented in digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of analyzing an attribute of a communication link, comprising:

obtaining error count data, wherein the error count data includes a plurality of error counts, the plurality of error counts including a current error count;

in a first state,
  entering a second state when the current error count is greater than a first threshold value but less than a second threshold value; and
  entering a third state when the current error count is greater than the second threshold value;
in the second state,
  for each error count obtained while in the second state, calculating a first sum, wherein the first sum is a sum of up to a first number of error counts associated with the second state;
  entering the third state when the first sum is greater than the second threshold value; and
  entering the first state when the first sum is less than the first threshold value and the first sum is the sum of the first number of error counts associated with the second state; and
in the third state,
  for each error count obtained while in the third state, calculating a second sum, wherein the second sum is the sum of up to a second number of error counts associated with the third state; and
  entering the first state when the second sum is less than the second threshold value and the second sum is the sum of the second number of error counts associated with the third state.

2. The method of claim 1, wherein, in the first state, entering the second state when the current error count is greater than the first threshold value but less than the second threshold value includes entering the second state when the current error count is greater than or equal to the first threshold value but less than the second threshold value.

3. The method of claim 1, wherein, in the first state, entering the second state when the current error count is greater than the first threshold value but less than the second threshold value includes entering the second state when the current error count is greater than the first threshold value but less than or equal to the second threshold value.

4. The method of claim 1, wherein, in the second state, entering the third state when the first sum is greater than the second threshold value includes entering the third state when the first sum is greater than or equal to the second threshold value.

5. The method of claim 1, wherein, in the second state, entering the first state when the first sum is less than the first threshold value and the first sum is the sum of the first number of error counts associated with the second state includes entering the first state when the first sum is less than or equal to the first threshold value and the first sum is the sum of the first number of error counts associated with the second state.

6. The method of claim 1, wherein, in the third state, entering the first state when the second sum is less than the second threshold value and the second sum is the sum of the second number of error counts associated with the third state includes entering the first state when the second sum is less than or equal to the second threshold value and the second sum is the sum of the second number of error counts associated with the third state.

7. The method of claim 1, further comprising, in the first state, remaining in the first state when the current error count is less than the first threshold value.

8. The method of claim 1, further comprising, in the first state, remaining in the first state when the current error count is less than or equal to the first threshold value.

9. The method of claim 1, further comprising, in the second state, remaining in the second state when the first sum is less than the second threshold value and greater than the first threshold value.

10. The method of claim 1, further comprising, in the second state, remaining in the second state when the first sum is less than the first threshold value and the first sum is the sum of less than the first number of error counts associated with the second state.

11. The method of claim 1, further comprising, in the third state, remaining in the third state if the second sum is greater than the second threshold value.

12. The method of claim 1, further comprising, in the third state, remaining in the third state if the second sum is the sum of less than the second number of error counts associated with the third state.

13. The method of claim 12, wherein the bit error rate threshold is a high-speed digital subscriber line bit error rate threshold.

14. The method of claim 1, further comprising, in any state, entering the first state when a reset condition exists.

15. The method of claim 1, wherein N equals sixty sample periods.

16. The method of claim 15, wherein the second state is an ALARM DETECTION STATE.

17. The method of claim 1, wherein obtaining error count data includes obtaining the current error count once during each of a plurality of sample periods.

18. The method of claim 17, wherein each of the plurality of sample periods is one second long.

19. The method of claim 18, further comprising raising an alarm when the ALARM STATE is entered.

20. The method of claim 17, wherein the third state is an ALARM STATE.

21. The method of claim 18, further comprising retiring the alarm when the NO ALARM STATE is entered.

22. The method claim 1, wherein the first threshold value is equal to zero.

23. The method of claim 1, wherein the second threshold value is equal to a bit error rate threshold.

24. The method of claim 1, wherein the first state is a NO ALARM STATE.

25. The method of claim 1, wherein the up to the first number of error counts associated with the second state summed to calculate the first sum define a first window.

26. The method of claim 1, wherein the up to the second number of error counts associated with the third state summed to calculate the second sum define a second window.

27. A telecommunication device, comprising:
an interface adapted to couple the telecommunication device to a communication link; and
wherein the telecommunication device is adapted to:
obtain error count data, wherein the error count data includes a plurality of error counts, the plurality of error counts including a current error count;
in a first state,
enter a second state when the current error count is greater than a first threshold value but less than a second threshold value; and
enter a third state when the current error count is greater than the second threshold value;
in the second state,
for each error count obtained while in the second state, calculate a first sum, wherein the first sum is a sum of up to N error counts associated with the second state;
enter the third state when the first sum is greater than the second threshold value; and
enter the first state when the first sum is less than the first threshold value and the first sum is the sum of N error counts associated with the second state; and
in the third state,
for each error count obtained while in the third state, calculate a second sum, wherein the second sum is the sum of up to N error counts associated with the third state; and
enter the first state when the second sum is less than the second threshold value and the second sum is the sum of N error counts associated with the third state.

28. The telecommunication device of claim 27, wherein the communication link is an HDSL4 communication link.

29. The telecommunication device of claim 28, wherein the telecommunication device further includes a line interface card coupled to the HDSL4 communication link.

30. The telecommunication device of claim 27, wherein the second threshold value is a bit error rate threshold.

31. The telecommunication device of claim 27, wherein N equals sixty sample periods.

32. The telecommunication device of claim 27, wherein obtaining error count data includes obtaining the current error count once during each of a plurality of sample periods.

33. The telecommunication device of claim 32, wherein each of the plurality of sample periods is one second long.

34. The telecommunication device claim 27, wherein the first threshold value is equal to zero.

35. The telecommunication device of claim 27, wherein the second threshold value is equal to a bit error rate threshold.

36. The telecommunication device of claim 35, wherein the bit error rate threshold is a high-speed digital subscriber line bit error rate threshold.

37. The telecommunication device of claim 27, wherein the first state is a NO ALARM STATE.

38. The telecommunication device of claim 37, wherein the second state is an ALARM DETECTION STATE.

39. The telecommunication device of claim 38, wherein the third state is an ALARM STATE.

40. The telecommunication device of claim 39, further comprising raising an alarm when the ALARM STATE is entered.

41. The telecommunication device of claim 39, further comprising retiring the alarm when the NO ALARM STATE is entered.

42. The telecommunication device of claim 27, wherein the up to the first number of error counts associated with the second state summed to calculate the first sum define a first window.

43. The telecommunication device of claim 27, wherein the up to the second number of error counts associated with the third state summed to calculate the second sum define a second window.

44. A line interface unit, comprising:
an upstream interface adapted to couple the line interface unit to an upstream communication link;
a downstream interface, coupled to the upstream interface, adapted to couple the line interface unit to a downstream communication link;
a controller, coupled to upstream interface and downstream interface, adapted to:
obtain error count data, wherein the error count data includes a plurality of error counts, the plurality of error counts including a current error count;

in a first state;
    enter a second state when the current error count is greater than a first threshold value but less than a second threshold value; and
    enter a third state when the current error count is greater than the second threshold value;
in the second state,
    for each error count obtained while in the second state, calculate a first sum,
    wherein the first sum is a sum of up to N error counts associated with the second state;
    enter the third state when the first sum is greater than the second threshold value; and
    enter the first state when the first sum is less than the first threshold value and the first sum is the sum of N error counts associated with the second state; and
in the third state,
    for each error count obtained while in the third state, calculate a second sum,
    wherein the second sum is the sum of up to N error counts associated with the third state; and
    enter the first state when the second sum is less than the second threshold value and the second sum is the sum of N error counts associated with the third state.

45. The line interface unit of claim 44, wherein the downstream link includes at least one twisted-pair telephone line.

46. The line interface unit of claim 45, wherein the downstream interface is adapted to couple the line interface unit to the at least one twisted-pair telephone line.

47. The line interface unit of claim 46, wherein the downstream link is an HDSL4 link.

48. The line interface unit of claim 47, wherein the downstream interface includes an HDSL4 framer.

49. The line interface unit of claim 45, wherein the downstream interface includes a hybrid circuit adapted to couple the downstream line interface unit to the at least one twisted-pair telephone line.

50. The line interface unit of claim 44, wherein the controller includes:
    a programmable processor coupled to the downstream interface; and
    a memory coupled to the programmable processor, wherein program instructions are stored in the memory.

* * * * *